US008861413B2

United States Patent
Immonen et al.

(10) Patent No.: US 8,861,413 B2
(45) Date of Patent: *Oct. 14, 2014

(54) POWER CONTROL FOR INTER-BAND MULTI-CARRIER CAPABLE DEVICES

(75) Inventors: Antti Oskari Immonen, Helsinki (FI); Jouni Kristian Kaukovuori, Vantaa (FI); Tero Henttonen, Espoo (FI); Seppo Rousu, Oulu (FI)

(73) Assignee: Broadcom Corporation, Irvine, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/370,533

(22) Filed: Feb. 10, 2012

(65) Prior Publication Data

US 2013/0194987 A1    Aug. 1, 2013

(30) Foreign Application Priority Data

Jan. 26, 2012 (GB) .................................. 1201337.1

(51) Int. Cl.
    *G08C 17/00* (2006.01)
(52) U.S. Cl.
    USPC ........................................ 370/311; 455/343.1
(58) Field of Classification Search
    CPC . H04W 52/36; H04W 52/362; H04W 52/365; H04W 52/367; H04W 52/14; H04W 52/146
    USPC ........................ 370/311, 310; 340/7.32–7.38; 455/343.1–343.6
    See application file for complete search history.

(56) References Cited

U.S. PATENT DOCUMENTS

| 2006/0182021 | A1* | 8/2006 | Kristensen et al. | 370/229 |
|---|---|---|---|---|
| 2007/0149137 | A1* | 6/2007 | Richardson et al. | 455/68 |
| 2007/0149238 | A1* | 6/2007 | Das et al. | 455/522 |
| 2010/0142455 | A1* | 6/2010 | Imamura | 370/329 |
| 2011/0275403 | A1 | 11/2011 | Chen et al. | 455/522 |
| 2011/0319120 | A1 | 12/2011 | Chen et al. | 455/522 |
| 2013/0039289 | A1* | 2/2013 | Lee et al. | 370/329 |

FOREIGN PATENT DOCUMENTS

| EP | 2343934 A1 | 7/2001 |
|---|---|---|
| WO | WO 2010/148813 A1 | 12/2010 |
| WO | WO 2010/151040 A1 | 12/2010 |
| WO | 2011122754 | 10/2011 |

OTHER PUBLICATIONS

"Vehicular Technology Conference Fall (VTC 2010-Fall)", published 2010, IEE, pp. 1-5, Hua et al, "Performance of Uplink Carrier Aggregation in LTE-Advanced Systems" (5 pages).
EP Search Report for corresponding GB patent Application No. GB1201337.1 mailed Jun. 20, 2012.

(Continued)

Primary Examiner — Gary Mui
(74) Attorney, Agent, or Firm — Stanton IP Law

(57) ABSTRACT

There are provided measures for enabling power control for inter-band multi-carrier capable devices, such as e.g. inter-band carrier aggregation capable devices. Such measures may exemplarily include calculating at least one output power restriction value for a cumulative output power for a combination of at least two uplink carriers of a terminal device, said two uplink carriers operating on different bands, signaling the calculated at least one output power restriction value to the terminal device, and performing power control for the at least two uplink carriers using the acquired at least one output power restriction value at the terminal device.

20 Claims, 6 Drawing Sheets

(56) References Cited

OTHER PUBLICATIONS

Alcatel—Lucent : "Harmoni cs and Intermodulati on Products caused by LTE Advanced Carri er Aggregati on of Band 2, 4 or 5 pl us addi ti onal new 716-728 downl i nk" 3GPP Draft; R4-113 984, 3rd Gen Erati on Partnershi P Proj Ect (3GPP), Mobi Le Competenc E Centre vol. RAN WG4, no. Athens, Greece; 20110822, Aug. 17, 2011, XP050543186 the whole document.

"3rd Generation Partnership Project; Technical Specification Group Radio Access Network; Evolved Universal Terrestrial Radio Access (E-UTRA); Study on signaling and procedure for interference avoidance for in-device coexistence (Release 11)", 3GPP Standard; 3GPP TR 36.816, 3rd, vol. RAN WG2, No. VII.0 .0, Jun. 24, 2011, pp. 1-40 XP050553600, the whole document.

\* cited by examiner

POWER CONTROL FOR INTER-BAND MULTI-CARRIER CAPABLE DEVICES

FIELD OF THE INVENTION

The present invention relates to power control for inter-band multi-carrier capable devices. More specifically, the present invention relates to measures (including methods, apparatuses and computer program products) for enabling power control for inter-band multi-carrier capable devices, such as e.g. inter-band carrier aggregation capable devices.

BACKGROUND

In modern and future (cellular) communication systems, an inter-band multi-carrier capability of devices such as terminal devices is gaining more attention and importance.

For example, in 3GPP systems, inter-band carrier aggregation represents an inter-band multi-carrier communication framework which shall be supported by devices such as terminal devices. In inter-band carrier aggregation, at least two carriers operating on different (frequency) bands are aggregated together in/for at least one of downlink and uplink.

When multiple carriers operating on different (frequency) bands are combined or aggregated (which is regarded as a carrier combination/aggregation transmission mode herein), such as in inter-band carrier aggregation, intermodulation distortion (IMD) is typically produced due to nonlinearity in active and/or passive components of a device transmitter (in case of uplink transmission), a device receiver (in case of downlink transmission) or a device transceiver (in both cases). Generally, intermodulation distortion components of (m+n)-th order are located at frequencies $m*f_1 \pm n*f_2$. For instance, assuming that uplink carriers at frequencies $f_{UL1}$ and $f_{UL2}$ are combined or aggregated, a second order $2*f_{UL2}$, and $f_{UL1} \pm f_{UL2}$, and a third order intermodulation component is located at one of frequencies $3*f_{UL1}$, $3*f_{UL2}$, $2*f_{UL1} \pm f_{UL2}$, $f_{UL1} \pm 2*f_{UL2}$, and so on.

When at least one (or part) of the intermodulation distortion components falls in a (frequency) band being used for some transmission operation by the device in question, e.g. a DL carrier, such intermodulation distortion can cause a significant amount of desensitization. Such desensitization is specifically applicable for certain (inter-band) combinations of standardized carriers depending on the frequency relations between uplink and downlink channel definitions.

Namely, for certain frequency relations between uplink and downlink channel definitions, (part of) intermodulation distortion components of uplink carrier combinations hit on top of a downlink carrier and thus destroy the performance thereof, if no additional power restrictions are in place. Referring to 3GPP uplink and downlink channel definitions according to 3GPP TS 36.104 (Table 5.5-1), for example, aggregating bands (i.e. aggregating component carriers operating on bands) B20 and B8 causes a third order intermodulation distortion component from B20 UL (832-862 MHz) and B8 UL (880-915 MHz) to overlap with B8 DL (925-960 MHz). Furthermore, (part of) intermodulation distortion components can also hit on top of some non-3GPP Radio Access Technology (RAT), for instance in the 2.4 GHz frequency band (ISM band) used e.g. by WLAN and Bluetooth. For instance, this is the case for the second order intermodulation distortion component when aggregating bands B4 and B12.

The intermodulation problem as outlined above, i.e. an excessive desensitization of some operating band/carrier (e.g. a DL carrier in case of a multi-band UL carrier combination), can be avoided if the intermodulation power of an intermodulation distortion component is sufficiently low so as compared with the actual transmission power of that operating band/carrier. For instance, desensitization could be considered to be not significant when being smaller than 0.5 dB.

However, there are currently no means for reliably and efficiently ensuring such sufficiently low level of desensitization in the context of intermodulation distortion for inter-band multi-carrier combinations or aggregations, particularly while avoiding coverage problems.

Namely, using band-specific power restriction values such as A-MPR is not effective for inter-band multi-carrier combinations or aggregations. On the one hand, specifying appropriate A-MPR values for all involved bands in all conceivable band/carrier combinations in a reliable manner is not easily feasible or at least cumbersome. On the other hand, even if so, separate power control of individual bands/carriers to be combined may lead to unnecessary or excessive reduction in coverage of the respective uplink/downlink transmissions for avoiding excessive desensitization.

Thus, there is a desire to improve power control for inter-band multi-carrier capable devices. More specifically, is a desire to improve power control for inter-band multi-carrier capable devices in terms of at least one of coverage and control flexibility, e.g. in the context of inter-band carrier aggregation.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising calculating at least one output power restriction value for a cumulative output power for a combination of at least two uplink carriers of a terminal device, said two uplink carriers operating on different bands, and signaling the calculated at least one output power restriction value to the terminal device.

According to an exemplary aspect of the present invention, there is provided a method comprising acquiring at least one output power restriction value for a cumulative output power for a combination of at least two uplink carriers of a terminal device, said two uplink carriers operating on different bands, at the terminal device, and performing power control for the at least two uplink carriers using the acquired at least one output power restriction value at the terminal device.

According to an exemplary aspect of the present invention, there is provided an apparatus (which may e.g. be arranged/configured for use on a network side of a cellular system), comprising at least one processor, at least one memory including computer program code, and at least one interface configured for communication with at least another apparatus, the at least one processor, with the at least one memory and the computer program code, being arranged/configured to cause the apparatus to perform: calculating at least one output power restriction value for a cumulative output power for a combination of at least two uplink carriers of a terminal device, said two uplink carriers operating on different bands, and signaling the calculated at least one output power restriction value to the terminal device.

According to an exemplary aspect of the present invention, there is provided an apparatus (which may e.g. be arranged/configured for use on a terminal side of a cellular system), comprising at least one processor, at least one memory including computer program code, and at least one interface configured for communication with at least another apparatus, the at least one processor, with the at least one memory and the computer program code, being arranged/configured to cause the apparatus to perform: acquiring at least one output power restriction value for a cumulative output power for a combination of at least two uplink carriers of a terminal device, said two uplink carriers operating on different bands, at the terminal device, and performing power control for the at least two uplink carriers using the acquired at least one output power restriction value at the terminal device.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise or be embodied as a (tangible) computer-readable (storage) medium or the like on which the computer-executable computer program code is stored, and/or the program may be directly loadable into an internal memory of the computer or a processor thereof.

Advantageous further developments or modifications of the aforementioned exemplary aspects of the present invention are set out in the following.

By virtue of any one of the aforementioned exemplary aspects of the present invention, an improved power control for inter-band multi-carrier capable devices in terms of at least one of coverage and control flexibility, e.g. in the context of inter-band carrier aggregation, is achievable.

By way of exemplary embodiments of the present invention, there is provided power control for inter-band multi-carrier capable devices. More specifically, by way of exemplary embodiments of the present invention, there are provided measures and mechanisms for enabling power control for inter-band multi-carrier capable devices (in/for cellular communication systems), such as e.g. inter-band carrier aggregation capable devices.

Thus, enhancements are achieved by methods, apparatuses and computer program products enabling power control for inter-band multi-carrier capable devices.

BRIEF DESCRIPTION OF DRAWINGS

For a more complete understanding of exemplary embodiments of the present invention, reference is now made to the following description taken in connection with the accompanying drawings in which.

DESCRIPTION OF EXEMPLARY EMBODIMENTS

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, the present invention and its embodiments may be applicable in any (cellular) communication system and/or network deployment operable with inter-band multi-carrier capable devices, e.g. in any (cellular) communication system and/or network deployment supporting inter-band carrier aggregation or the like.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for enabling power control for inter-band multi-carrier capable devices.

In the following, exemplary embodiments of the present invention are described with reference to methods, procedures and functions, as well as with reference to structural arrangements and configurations.

More specifically, without restricting generality, the present invention and exemplary embodiments thereof are described with reference to a 3GPP-based LTE communication system and inter-band carrier aggregation therein.

As used herein, any references to aggregation or combination of bands (in the context of carrier aggregation) encompasses or corresponds to aggregation or combination of component carriers operating on respective bands.

Figure 1:
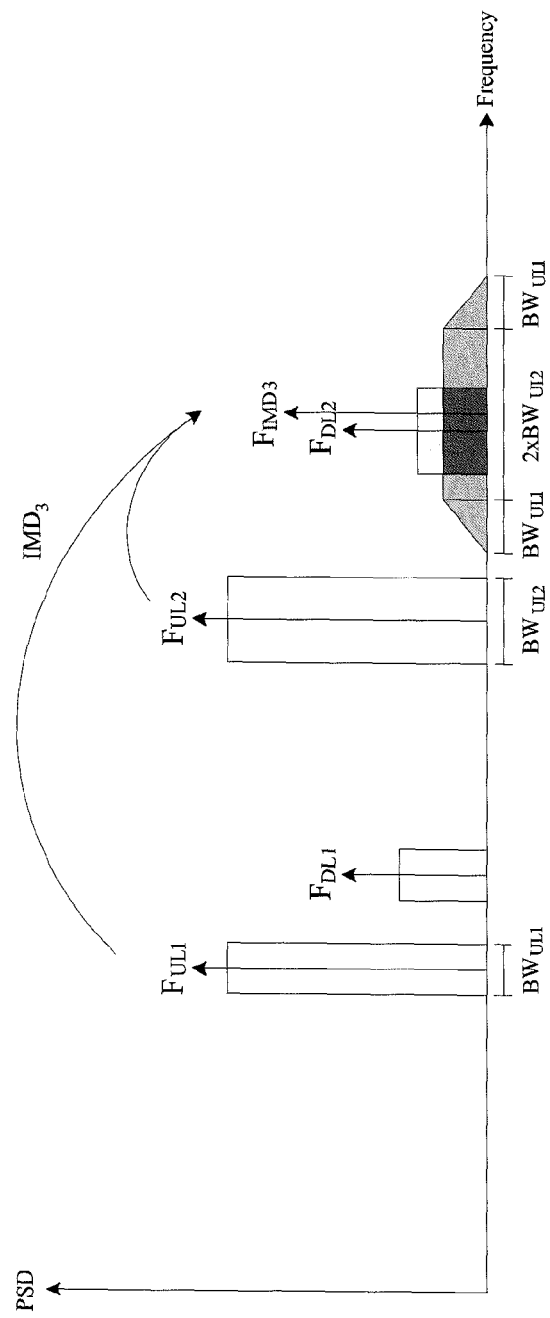
FIG. 1 shows a diagram of an example of third order intermodulation distortion on a downlink band, for which exemplary embodiments of the present invention are applicable.

FIG. 1 shows a diagram of an example of third order intermodulation distortion on a downlink band, for which exemplary embodiments of the present invention are applicable. In FIG. 1, the power spectral density is plotted over the frequency.

Regarding FIG. 1, it is noted that only third order intermodulation distortion is illustrated as a non-limiting example of a distortion/interference source. Nonetheless, other distortion/interference sources are equally applicable in the context of exemplary embodiments of the present invention. For example, at least in some operational cases, harmonics of certain carriers and/or adjacent channel powers (according to ACLR) of fundamental carrier powers and/or adjacent channel powers (according to ACLR) of harmonic carrier powers and/or intermodulation distortion results of ACLR may also be applicable and, thus, may be taken into account. In FIG. 1, such other conceivable distortion/interference sources are not illustrated for the sake of clarity only.

For the example of FIG. 1, it is generally assumed that two uplink carriers of different bands are combined, wherein (part of) a third order intermodulation distortion component is caused to fall on the downlink carrier of one of the two different bands. For illustrating the different effects of the two uplink carriers in the third order intermodulation distortion component, the two different bands are exemplarily assumed to have different bandwidths. In this regard, it is to be noted that, according to operational use cases, bandwidths of different bands may be also equal, and exemplary embodiments of the present invention are equally applicable for bands with the same or different bandwidths. In the present example, output powers of two uplink carriers may vary independently according to network power control commands for both components, and it is to be noted that exemplary embodiments of the present invention are equally applicable for any output powers and output power relationships of bands. Further, it is assumed that the third order intermodulation distortion component exhibits twice the effect of the uplink carrier 2 as compared with the uplink carrier 1, i.e. $F_{IMD3}=F_{UL1}\pm 2 \cdot F_{UL2}$. Accordingly, the downlink carrier of the second band suffers from desensitization, as described above.

Generally, it is to be noted that the following equations adopt simple adding operations, thus combining powers herein is simple, for instance 10 dB+10 dB=20 dB and not 13 dB.

In case of second order intermodulation, the intermodulation power of intermodulation (IMD2) is given by $$P_{IMD2}=Px+Py-IIP2, \quad (1)$$

wherein Px is the power of the victim band uplink (e.g. UL2), Py is the power of the jammer band uplink (e.g. UL1), i.e. the power of another (isolated) uplink antenna, and IIP2 is the second order intermodulation performance parameter e.g. of a front-end antenna switch.

The equation (1) can be written as $$P_{IMD2}=P1+(P2-ANT_{ISOLATION})-IIP2, \quad (1)$$

wherein P1 and P2 are the TX powers of the uplinks UL1 and UL2, respectively, $ANT_{ISOLATION}$ is an antenna isolation, and IIP2 is the intermodulation performance parameter.

In case of third order intermodulation, the intermodulation power of intermodulation (IMD3) is given by $$P_{IMD3}=2 \cdot Px+Py-2 \cdot IIP3, \quad (3)$$

and the equation (3) can be written as $$P_{IMD3}=2 \cdot P1+(P2-ANT_{ISOLATION})-2 \cdot IIP3, \quad (4)$$

wherein IIP3 is the third order intermodulation performance parameter e.g. of a front-end antenna switch.

In equations (2) and (4), $ANT_{ISOLATION}$ and IIP2/IIP3 represent device-specific parameters of the device in question, e.g. a terminal device such as a UE. The antenna isolation is a device-specific parameter/value which alters between at least one of devices, antennas, frequencies, active antenna locations, and use cases (hand effects, mechanical structures positioning, etc.), and the intermodulation performance parameter IIP2/IIP3 are device-specific (typically component) parameters/values, i.e. constants typically given (guaranteed) by the component manufacturer.

As rule of thumb, which is adopted herein by way of example only, desensitization shall not exceed 0.5 dB. This means that the IMD power should be 10 dB below reference sensitivity (B_xy_refsens).

When trying to use conventional band-specific power restriction values such as A-MPR, appropriate power restrictions for individual inter-band uplinks being combined would be extremely difficult and unreliable to define, as outlined hereinafter as a comparative example.

Referring to equations (2) and (4) above, it is evident that (almost) the only way to define power restrictions would be to assume UL2 without A-MPR and then calculate the maximum output power for UL1 according to e.g. equation (2) or (4). Thereby, the maximum power reduction needed for UL1 could be obtained, that ensures desensitization of less than 0.5 dB independent of the UL2 TX power. After that, the same operation would need to be done for UL2. Even after that, the actual power restriction is not unambiguously clear, since both ULs can actually not be restricted according to the calculation where another UL is without A-MPR.

In order to clarify this, a short example is given of the IMD2 calculation described above using equation (2).

Therein, since the maximum output power per device (e.g. UE) is defined by (23+−3 dBm), the maximum output power per band is assumed to be 20 dB. Further, the following values are exemplarily assumed:

$ANT_{ISOLATION}$=20 dBm
IIP2=115 dBm
P2=20 dBm
B_xy_refsens=−94 dBm ⇒ $P_{IMD2}$=−104 dB (i.e. 10 dB below B_xy_refsens to guarantee desensitization of less than 0.5 dB).

For UL1, equation (2) thus reads: P1+20−20−115=−104 dBm
Accordingly, the maximum output power P1 for UL1 is
P1=11 dBm (i.e. respective A-MPR would be 20−11=9 dB)
For UL2, equation (2) thus reads: 20+P2−20−115=−104 dBm
Accordingly, the maximum output power P2 for UL2 is
P2=11 dBm (i.e. respective A-MPR would be 20−11=9 dB)

However, despite the result of these exemplary calculations, restrictively defining that the maximum output power is 11 dBm per band is not appropriate. On the other hand, it is not appropriate to restrictively define that, assuming another band is transmitting at +20 dBm, the maximum allowed output power for another band is 11 dBm.

In brief, current A-MPR signaling would have to be in the form of:
A dB for P1 (according to the above example e.g. A=9 dB)
B dB for P2 (according to the above example e.g. B=9 dB)
a fixed restriction for P1, e.g. +20 dBm
a fixed restriction for P2, e.g. +20 dBm
A band-specific network signaling value (giving e.g. A-MPR) is included in both A and B.

Accordingly, it is not appropriate to use band-specific power restriction values such as A-MPR for defining power restrictions for individual inter-band uplinks being combined.

According to exemplary embodiments of the present invention, power restriction values for combinations of inter-band uplinks, i.e. combination- or aggregation-specific power restriction values are proposed, as explained hereinafter.

In order to clarify this, short examples are given of IMD calculations described above using the above equations, which use the same example values as the above example for conventional band-specific power restriction values.

Namely, since the maximum output power per device (e.g. UE) is defined by (23+−3 dBm), the maximum output power per band is assumed to be 20 dB. Further, the following values are exemplarily assumed:

$ANT_{ISOLATION}$=20 dBm $B\_xy\_refsens$=−94 dBm⇒$P_{IMD2}$=−104 dB (i.e. 10 dB below $B\_xy\_refsens$ to guarantee desensitization of less than 0.5 dB).

For IMD2, assuming IIP2=115 dBm, equation (2) thus reads:

$$P1+P2-20-115=-104 \text{ dBm}$$

Accordingly, the value for P1+P2, which is an example of an output power restriction value for a cumulative output power for a combination of the two uplinks UL1 and UL2 according to exemplary embodiments of the present invention, denoted as C herein, is $$C=P1+P2=-104-(-115)-(-20)=31 \text{ dBm}$$

For IMD3, assuming IIP3=68 dBm, equation (4) thus e.g. reads:

$$2*P1+P2-20-2*68=-104 \text{ dBm}$$

This is the case when assuming that UL1 is the victim band uplink, while 2*P1+P2 would be replaced by P1+2*P2 when assuming that UL2 is the victim band uplink. That is to say, the coefficient depends on the victim band.

Accordingly, the value for **2*P1+P2**, which is an example of an output power restriction value for a cumulative output power for a combination of the two uplinks UL1 and UL2 according to exemplary embodiments of the present invention, denoted as C herein, is $$C=2*P1+P2=-104-(-2*68)-(-20)=52 \text{ dBm}$$

According to exemplary embodiments of the present invention, at least one output power restriction value for a cumulative output power for a combination of at least two uplinks is calculated at the network side, signaled to a device/terminal side, and used at the device/terminal side for power control.

Accordingly, as a result of the above example, the output power restriction value/s C being utilized could be in the form of:

C=P1+ID2=31 dBm for IMD2, and/or

C=2*P1+P2=52 dBm or C=P1+2*P2=52 dBm for IMD3.

According to exemplary embodiments of the present invention, the output power restriction value/s C could be represented as an indication of a maximum allowable output power value of the combination of uplinks, as exemplified above. In this case, the power control at the device/terminal side is performed such that the cumulative output power for the combination of the uplink carriers is equal to or less than the output power restriction value/s C.

According to exemplary embodiments of the present invention, the output power restriction value/s C could also be represented as an indication of a maximum output power reduction value of the combination of uplinks. In this case, the power control at the device/terminal side is performed such that the cumulative output power for the combination of the uplink carriers is equal to or less than the difference between a maximum output power value and the output power restriction value/s C.

For the latter case, power restriction related signaling according to exemplary embodiments of the present invention could have to be in the form of:

C=P1+P2=31 dBm for IMD2, and/or C=2*P1+P2=52 dBm or

C=P1+2*P2=52 dBm for IMD3, and a fixed restriction (i.e. a maximum allowable output power value) per band, e.g. +20 dBm.

According to exemplary embodiments of the present invention, power restriction related signaling could have to be in the form of:

NS_xy dB for P1,

NS_yx dB for P2,

C=P1+P2=31 dBm for IMD2, and/or C=2*P1+P2=52 dBm or C=P1+2*P2=52 dBm for IMD3, and a fixed restriction (i.e. a maximum allowable output power value) per band, e.g. +20 dBm.

The values NS_xy and NS_yx included in this exemplary signaling are band-specific network signaling values (giving band-specific output power restriction values such as e.g. A-MPR), which are given in addition to the combination-specific output power restriction value C. It is noted that xy and yx in NS_xy and NS_yx constitute placeholders which may represent any number, e.g. NS_01, NS_02, and so on. That is to say, corresponding information according to exemplary embodiments of the present invention may be signaled in any (specified) network signaling (NS) value.

The referenced NS values are not output power reduction values themselves, but may contain e.g. a table of output power reduction values (e.g. A-MPR values) which depend on different conditions (number of RBs, CC placement etc.). Therefore, the amount of e.g. A-MPR in a NS value can vary from 0 to 12 dB within NS_xy or NS_yx, for example.

Such signaling example is in compliance with current specifications, which prescribe signaling of such values relating to coexistence scenarios between certain bands. In such example, the UE needs to ensure that both conditions on the basis of C and NS_xy/NS_yx are satisfied.

For example, in case of IMD2, when assuming C=35 dB, NS_xy gives A-MPR$_{P1}$=5 dB and NS_yx gives A-MPR$_{P2}$=0 dB, the UE can give up to P1=23−5 dB=18 dB for the band relating to the NS_xy signaling value, and can give up to P2=35−18=17 dB for the band relating to the NS_yx signaling value. Thereby, excessive output powers could be avoided, which could make the relevant IMD2 distortion component too large, as compared with a case in which only band-specific output power restriction values are signaled and used for power control (in which case the sum of resulting band-specific output powers of 18 dB and 23 dB would amount to an excessive value of 41 dB).

Figure 2:
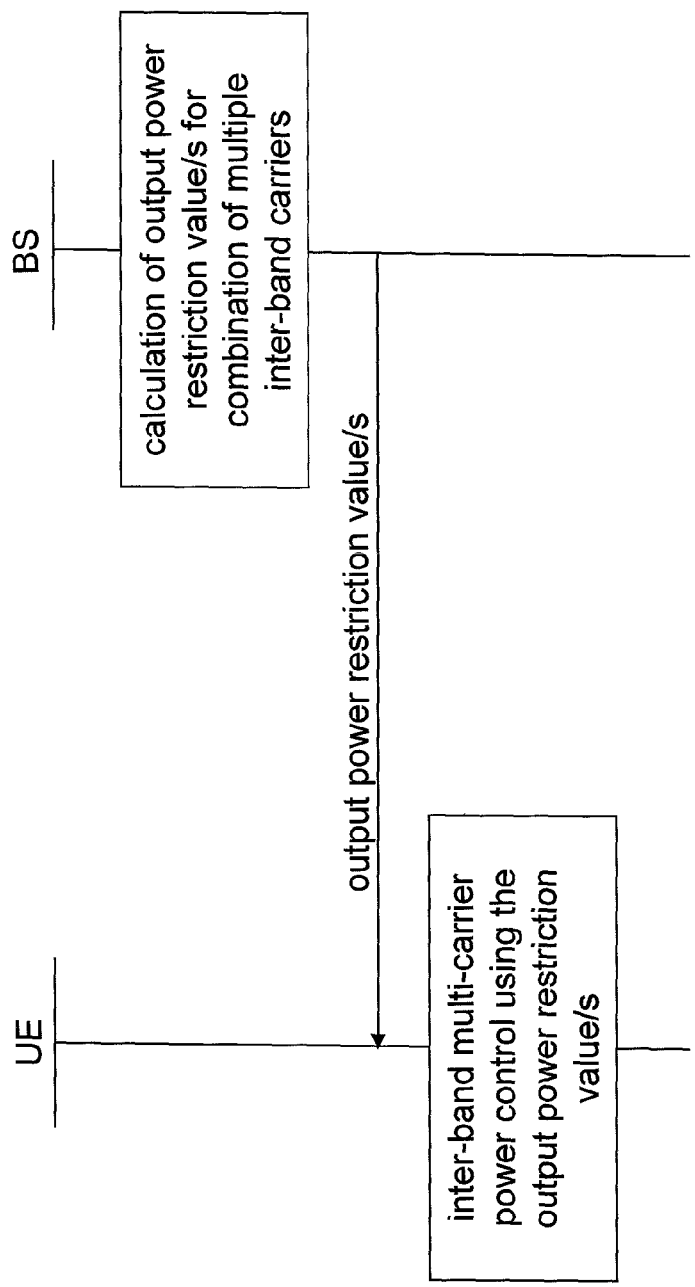
FIG. 2 shows a schematic diagram of an exemplary procedure according to exemplary embodiments of the present invention.

FIG. 2 shows a schematic diagram of an exemplary procedure according to exemplary embodiments of the present invention.

As shown in FIG. 2, a procedure according to exemplary embodiments of the present invention comprises the following operations/functions.

At the network side, i.e. at a base station or access node (BS) such as a eNB or the like, at least one output power restriction value for a cumulative output power for a combination of at least two uplink carriers of a terminal device such as a UE or the like, said two uplink carriers operating on different bands, is calculated, and the calculated at least one output power restriction value is signaled to the terminal device. At the device/terminal side, i.e. at the device or terminal such as a UE, the signaled at least one output power restriction value is acquired, and power control for the at least two uplink carriers is performed using the acquired at least one output power restriction value at the terminal device.

According to exemplary embodiments of the present invention, signaling may comprise transmitting a corresponding signaling message or the like, and acquiring may comprise receiving a corresponding signaling, signaling message or the like.

According to exemplary embodiments of the present invention, any output power restriction value C is calculated on the basis of an intermodulation power equation for the intermodulation power of the at least two uplink carriers. For example, the above second- and third-order intermodulation power equations for $P_{IMD2}$ and $P_{IMD3}$ could be used in this regard, as exemplified in the above example. When using such intermodulation power equations, an allowable intermodulation power is to be specified or assumed (in the above example, −104 dBm), and one or more related device-specific parameters of the terminal device are to be employed (in the above example, $ANT_{ISOLATION}$ and IIP2/IIP3). For example, values of $ANT_{ISOLATION}$ and IIP2/IIP3 may be read from look up tables. In some embodiments, a terminal may execute measurements to define isolation value/s between antennas and/or other relevant parameters/values so as to derive corresponding values.

According to exemplary embodiments of the present invention, any output power restriction value C may be calculated as a maximum allowable output power value. This may be accomplished by direct usage of respective intermodulation power equations. Also, any output power restriction value C may be calculated as a maximum output power reduction value. This may be accomplished by calculating a difference between a maximum output power and a maximum allowable output power value being directly derivable from respective intermodulation power equations.

Furthermore, in the calculation of the output power restriction value/s, network conditions may also be taken into consideration. This may be involved in the context of setting required output powers for UEs by the network (i.e. when the network asks the UEs to increase/decrease power depending on the network conditions). In this regard, e.g. the longer the distance between the base station and the device/terminal and/or the higher the interference level on some uplink transmission, the more power the base station requires the device/terminal to use for uplink transmissions.

According to exemplary embodiments of the present invention, any output power restriction value may comprise an output power restriction value for each combination of uplink carriers of the terminal device, or an output power restriction value for those combinations of uplink carriers of the terminal device, which cause intermodulation distortion on at least one of a downlink carrier and a reception band of the terminal device, or an output power restriction value for a group of combinations of uplink carriers of the terminal device, which cause a specific order intermodulation distortion (i.e. an intermodulation distortion of a specific order) on at least one of a downlink carrier and a reception band of the terminal device.

Exemplary embodiments of the present invention comprise calculation, signaling and power control application of power restriction values per all combined ULs or, at least, per all relevant combined ULs (e.g. those ULs being usable at the UE and/or those ULs causing intermodulation distortion in relevant band/s). Further, instead of defining different power restriction values for each (relevant) band combination, power restriction values for certain (relevant) band combination could also be grouped, e.g. based on a root for interference or order of IMD (e.g. IMD2, IMD3, and so on). Accordingly, as in the above example, a power restriction value C could be defined for IMD2 and a power restriction value C could be defined for IMD3. Thus, there could in practice be around 2 to 5 different power restriction values needed to tackle all relevant inter-band combinations with intermodulation distortion problems.

Figure 3:
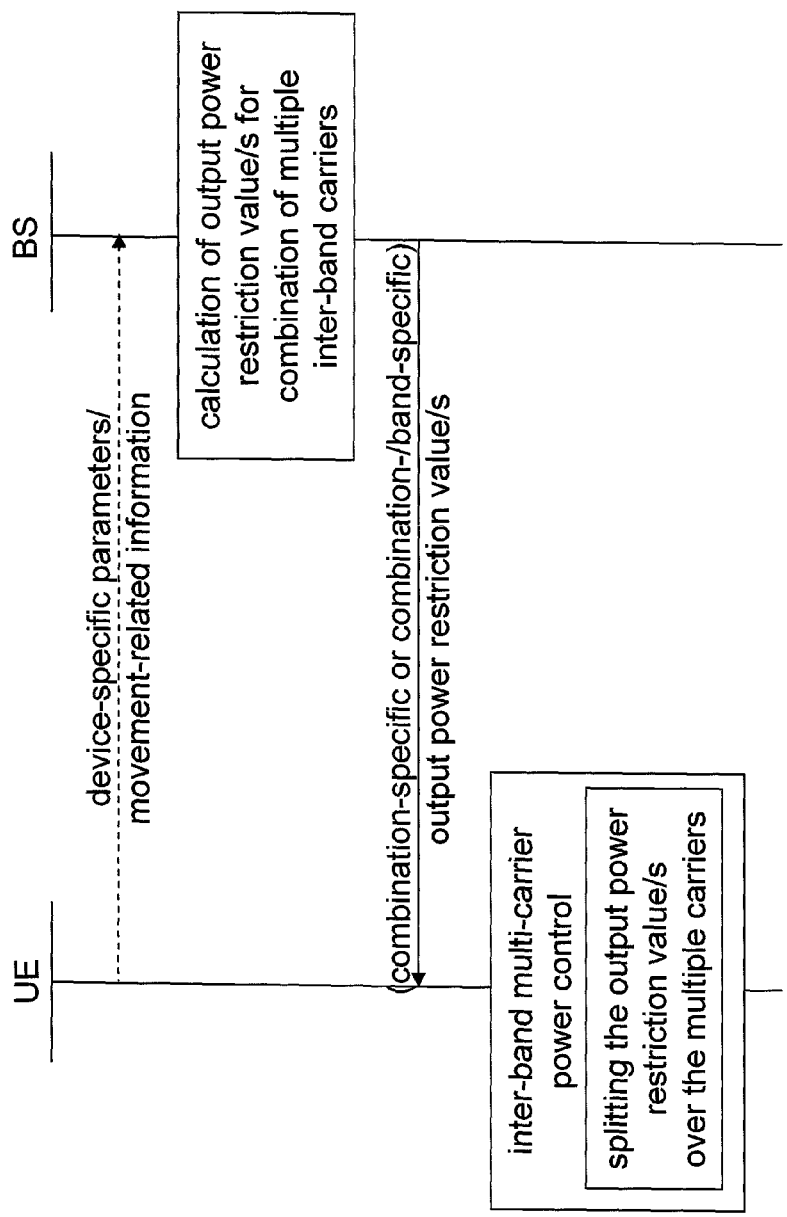
FIG. 3 shows a schematic diagram of another exemplary procedure according to exemplary embodiments of the present invention.

FIG. 3 shows a schematic diagram of another exemplary procedure according to exemplary embodiments of the present invention.

As shown in FIG. 3, a procedure according to exemplary embodiments of the present invention comprises the operations/functions of the procedure according to FIG. 2. In addition thereto, the procedure according to FIG. 3 comprises at least one of the following operations/functions (both of which are illustrated for the sake of simplicity in FIG. 3).

On the one hand, one or more of the device-specific parameters required to calculate the power restriction value/s at the network side, may be notified from the UE to the BS. In the above example, $ANT_{ISOLATION}$ and IIP2/IIP3 could be signaled in this way. Further, the BTS may be notified from the UE with information regarding a movement state of the device/terminal, e.g. whether the UE is a moving or non-moving device and/or speed information. The BTS may use such movement-related information to calculate the power restriction value/s at the network side. Namely, with a non-moving or slowly moving device, the network may use e.g. different algorithms or margins than with a moving or rapidly moving device.

The device-specific parameters and/or the movement-related information may be notified on demand, e.g. upon request from the network side and/or after having been changed. Such notification from the device/terminal is effective in that the device/terminal knows its own device-specific parameters and/or movement-related information, which may be based on current measurement or detection and/or standard values or positioning (which may e.g. be pre-stored in the course of manufacturing or product testing, etc.).

On the other hand, additionally or alternatively (and independent of the above-outlined notification of device-specific parameters), the power control at the device/terminal side may comprise splitting the output power restriction value/s over the at least two uplink carriers of the terminal device. As outlined above, such splitting is to be such that the cumulative output power for the combination of the uplink carriers is equal to or less than the output power restriction value/s C when the output power restriction value/s C indicate a maximum allowable output power value, and such splitting is to be such that the cumulative output power for the combination of the uplink carriers is equal to or less than the difference between a maximum output power value and the output power restriction value/s C when the output power restriction value/s C indicate a maximum output power reduction value.

In general terms, such power restriction value splitting may be based on at least one of one or more device properties of the terminal device (such as selected active antennas, alternate radio (e.g. WLAN) interoperability, and the like), one or more interference conditions on at least one of a downlink carrier and a reception band of the terminal device, and one or more performance requirements of at least one of a downlink carrier and a reception band of the terminal device.

According to exemplary embodiments of the present invention, besides the combination-specific output power restriction values C, band-specific output power restriction values (e.g. given by NS_xy/NS_yx) for the at least two uplink carriers may additionally be signaled form the BS to the UE. In this case, the UE may acquire both types of output power restriction values and may perform the power control using the acquired combination-specific output power restriction values and the acquired band-specific output power restriction values. In this regard, also relating to power control/splitting, reference is made to the above signaling example including both C and NS_xy/NS_yx values.

In view of the above, according to exemplary embodiments of the present invention, flexibility in power control of uplinks in the context of uplink carrier combination or aggregation could be achieved, while avoiding coverage problems.

Namely, by signaling the value C for the device/terminal, there is flexibility for the device/terminal to assign power to uplinks on use case interference scenario specific basis. As e.g. in the exemplary cases of IMD2 and IMD3, as outlined above, the respective equations contain only constants and power factors P1 and P2, the value C could be used for power control e.g. by splitting between factor P1 for UL1 and P2 for UL2 depending on the actual use case interference scenario and the like. The ratio between power restrictions for uplinks is not fixed but is device and network scenario specific.

In the following, two exemplary use cases for exemplary embodiments of the present invention are given.

Figure 4:
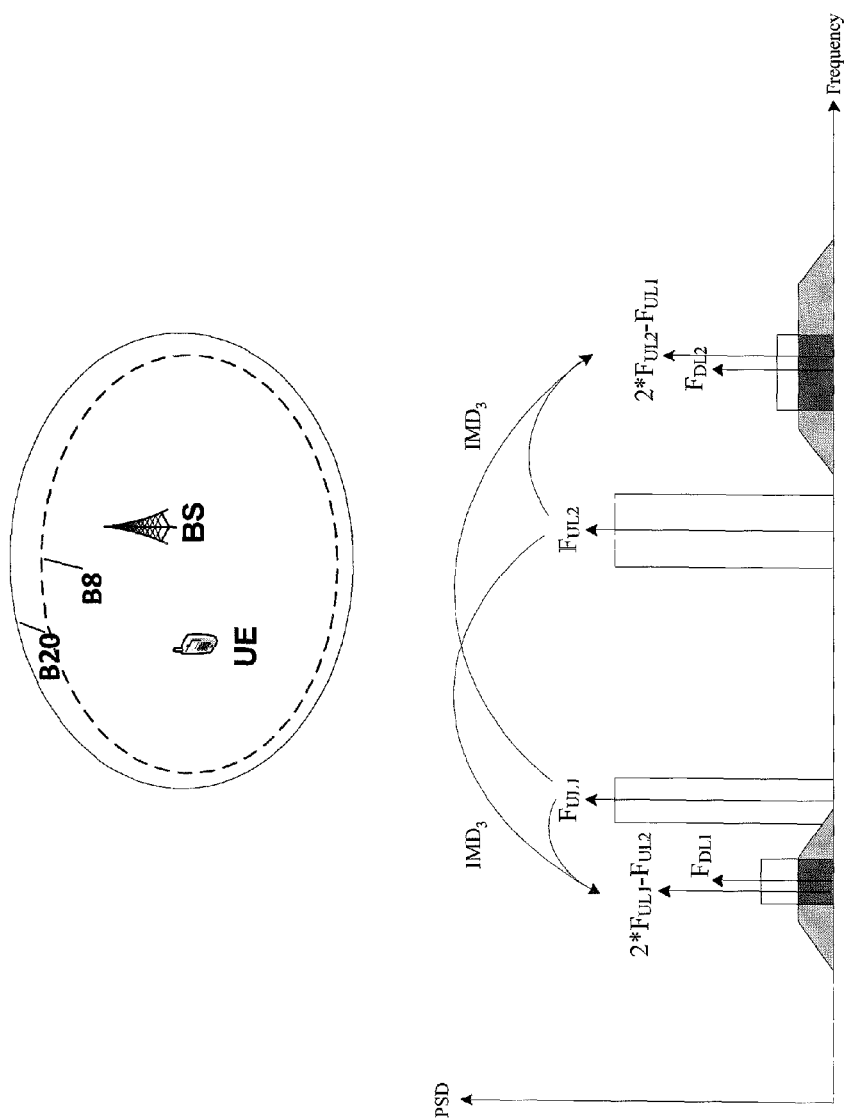
FIG. 4 shows a diagram of an example of third order intermodulation distortion on two downlink bands, for which exemplary embodiments of the present invention are applicable.

FIG. 4 shows a diagram of an example of third order intermodulation distortion on two downlink bands, for which exemplary embodiments of the present invention are applicable.

As illustrated on the top of FIG. 4, a carrier aggregation scenario with two 3GPP-standardized bands B8 and B20 in the 1 GHz range (i.e. two low-range bands) is assumed, and it is assumed that a single base station BS is used for UE-BS transmission on these two bands. As the two bands have a similar frequency, the radiuses of coverage for the two bands are rather similar, but differ from each other due to different propagation losses.

As illustrated on the bottom of FIG. 4, due to third order intermodulation of the combination of uplink carriers in the band B20 (denoted as UL1) and B8 (denoted as UL2), the DLs of both bands suffer from desensitization.

In this case, as outlined above, it may be assumed that the BS signals an output power restriction value C=52 dBm for $2*P_8+P_{20}$. Then, the UE may split the value of 52 dBm between the uplinks UL1 and UL2 according to device properties and/or interference conditions and/or performance requirements. Accordingly, the UE has flexibility in splitting the network-signaled output power restriction value thereby avoiding excessive desensitization of downlink/carrier transmission in question, while enabling to maximize coverage for each band combination.

In the power control operation, e.g. the splitting, as well as in the calculation operation, the different weights of the individual uplinks/carriers depending on consideration of the victim uplink/carrier is taken into account. Namely, for example in the case of third and fifth order intermodulation, the power in the band has twice the impact as the power of the other (jammer) band.

Figure 5:
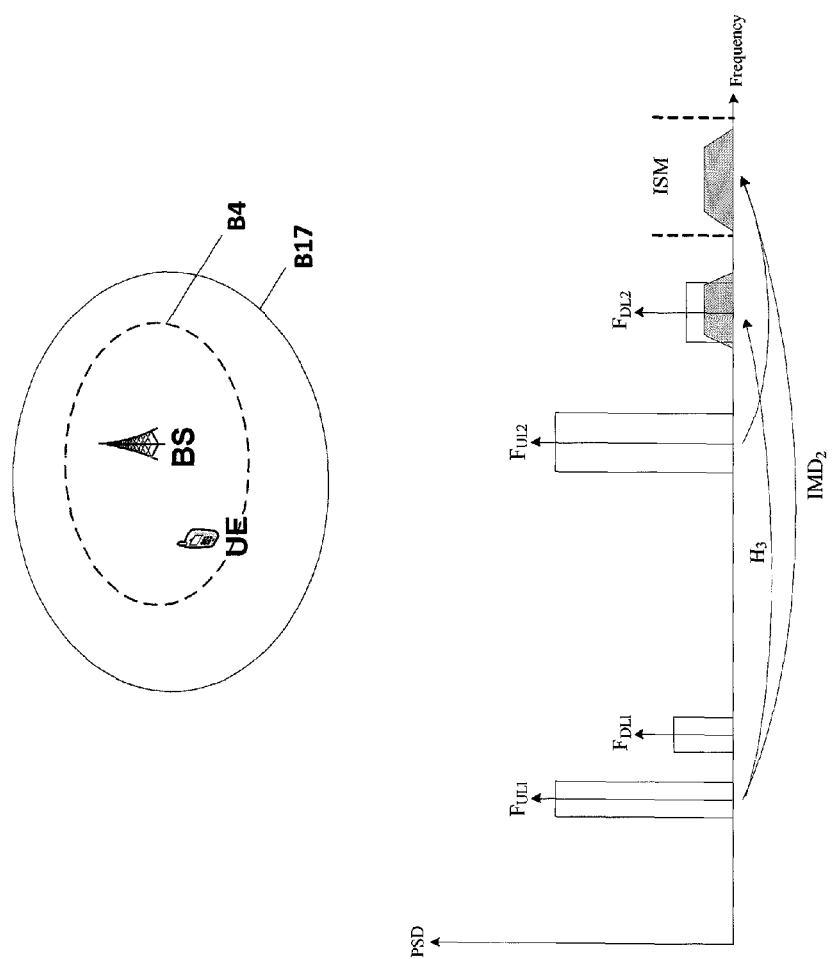
FIG. 5 shows a diagram of an example of third order harmonic distortion on a downlink band and second order intermodulation distortion on a reception band, for which exemplary embodiments of the present invention are applicable.

FIG. 5 shows a diagram of an example of third order harmonic distortion on a downlink band and second order intermodulation distortion on a reception band, for which exemplary embodiments of the present invention are applicable.

As illustrated on the top of FIG. 5, a carrier aggregation scenario with two 3GPP-standardized bands is assumed, wherein the band B17 resides in the 1 GHz range (i.e. a low-range band) and the band B4 resides in the 2 GHz range (i.e. a high-range band), and it is assumed that a single base station BS is used for UE-BS transmission on these two bands. As the two bands have a quite different frequency, the radiuses of coverage for the two bands are quite different as well.

As illustrated on the bottom of FIG. 5, two kinds of distortion may be relevant in such case. On the one hand, the ISM suffers from desensitization due to (part of the) second order intermodulation of the combination of uplink carriers in the band B17 (denoted as UL1) and B4 (denoted as UL2). On the other hand, (part of) the third harmonic (H3) of the uplink of the band B17 hits the downlink of the band B4, thus suffering from desensitization as well.

In this case, it may be straightforward to decrease the UL power of the band B17 due to its better range and coverage area. However, at the same time, as both ULs cause IMD2 to the 2.4-GHz ISM band, the UE may implement a C value power split between UL1 and UL2 according to performance requirements of its own DL channel and alternate RAT radio (e.g. WLAN, Bluetooth, etc.) receptions in the 2.4-GHz ISM band in order to keep both radio systems/transmissions operating. Accordingly, using the value C from the network, the UE may appropriately perform power control in consideration of both requirements/conditions/approaches mentioned above.

Generally, it is to be noted that the above examples commonly assume a combination of two uplinks or two uplink carriers, respectively. Such assumption is made only by way of example in an effort to simplify explanation of the principles of the present invention and its embodiments. Irrespective thereof, any number of uplinks or uplink carriers could be combined and corresponding output power restriction values could equally be calculated, signaled and applied as well. That is to say, exemplary embodiments of the present invention are not limited to a specific number of uplinks or uplink carriers to be combined.

Further, it is noted that the above examples mainly relate to second and third order intermodulation. Such relation is made only by way of example in an effort to simplify explanation of the principles of the present invention and its embodiments. Irrespective thereof, any kind, type, source, modulation and order of intermodulation could be equally considered as well. That is to say, exemplary embodiments of the present invention are not limited to a specific order intermodulation to be considered.

Still further, it is noted that inter-band multi-carrier capable devices are herein assumed to consistently operate in a carrier combination/aggregation transmission mode. While such devices are typically also operable in a single carrier transmission mode, such transmission mode and/or a switching between such transmission modes is not a relevant aspect of the present specification.

Still further, it is noted that the above examples are mainly described with respect to intermodulation distortion and harmonic distortion. Yet, it is to be noted that the principles of the present invention are equally applicable to any other distortion/interference sources as well. According to exemplary embodiments of the present invention, at least one distortion/interference component may comprise one or more of an intermodulation power, a harmonic power, a fundamental power, a fundamental channel leakage power (e.g. ACLR power), and a harmonic channel leakage power (e.g. harmonic fundamental ACLR power) of the at least one uplink band of the terminal device. Stated in other words, the source of distortion/interference is not relevant for the applicability of exemplary embodiments of the present invention.

Generally, the above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software, algorithms, and/or hardware thereof.

Respective exemplary embodiments of the present invention are described below referring to FIG. 6, while for the sake of brevity reference is made to the detailed description with regard to FIGS. 1 to 5.

Figure 6:
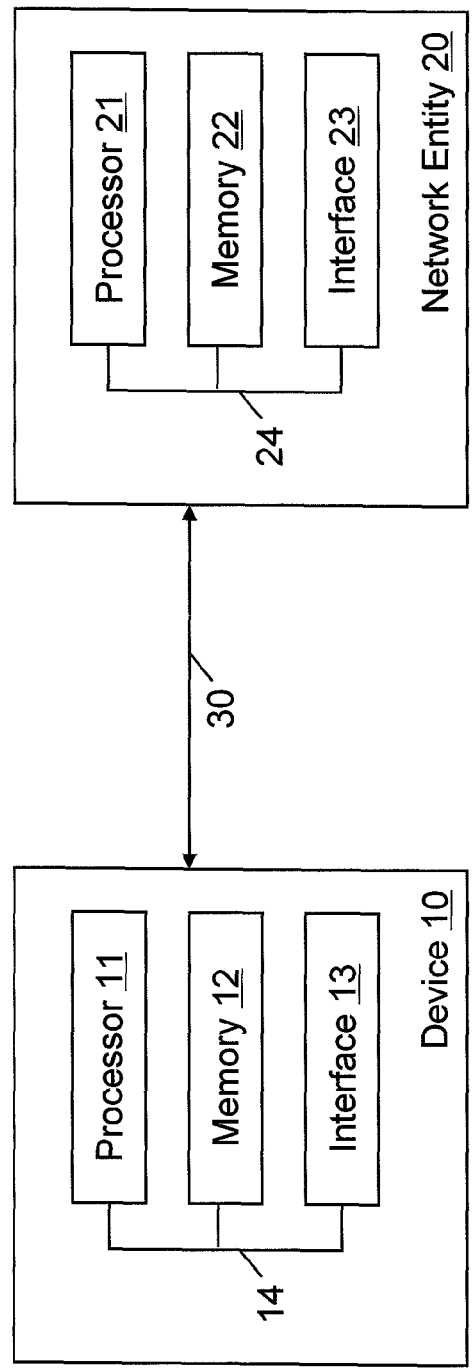
FIG. 6 shows a schematic block diagram illustrating exemplary apparatuses according to exemplary embodiments of the present invention.

In FIG. 6 below, which is noted to represent a simplified block diagram, the solid line blocks are basically configured to perform respective operations as described above. The entirety of solid line blocks are basically configured to perform the methods and operations as described above, respectively. With respect to FIG. 6, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 6, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 6 shows a schematic block diagram illustrating exemplary apparatuses according to exemplary embodiments of the present invention.

In view of the above, the thus described apparatuses 10 and 20 are suitable for use in practicing the exemplary embodiments of the present invention, as described herein.

The thus described apparatus 10 may represent a (part of a) device or terminal such as a mobile station MS or user equipment UE or a modem (which may be installed as part of a MS or UE, but may be also a separate module, which can be attached to various devices), and may be configured to perform a procedure and/or functionality as described in conjunction with any one of FIGS. 2 and 3. The thus described apparatus 20 may represent a (part of a) network entity, such as a base station or access node or any network-based controller, e.g. an eNB, and may be configured to perform a procedure and/or functionality as described in conjunction with any one of FIGS. 2 and 3.

As indicated in FIG. 6, according to exemplary embodiments of the present invention, each of the apparatuses comprises a processor 11/21, a memory 12/22 and an interface 13/23, which are connected by a bus 14/24 or the like, and the apparatuses may be connected via link A, respectively.

The processor 11/21 and/or the interface 13/23 may also include a modem or the like to facilitate communication over a (hardwire or wireless) link, respectively. The interface 13/23 may include a suitable transceiver coupled to one or more antennas or communication means for (hardwire or wireless) communications with the linked or connected device(s), respectively. The interface 13/23 is generally configured to communicate with at least one other apparatus, i.e. the interface thereof.

The memory 12/22 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

In its most basic form, according to exemplary embodiments of the present invention, the apparatus 10 or its processor 11 is configured to perform acquiring at least one output power restriction value for a cumulative output power for a combination of at least two uplink carriers of a terminal device, said two uplink carriers operating on different bands, at the terminal device (thus the apparatus comprising corresponding means for acquiring), and performing power control for the at least two uplink carriers using the acquired at least one output power restriction value at the terminal device (thus the apparatus comprising corresponding means for performing power control).

In its most basic form, according to exemplary embodiments of the present invention, the apparatus 20 or its processor 21 is configured to perform calculating at least one output power restriction value for a cumulative output power for a combination of at least two uplink carriers of a terminal device, said two uplink carriers operating on different bands (thus the apparatus comprising corresponding means for calculating), and signaling the calculated at least one output power restriction value to the terminal device (thus the apparatus comprising corresponding means for signaling).

For further details regarding the operability/functionality of the individual apparatuses, reference is made to the above description in connection with any one of FIGS. 1 to 5, respectively.

According to exemplarily embodiments of the present invention, a system may comprise any conceivable combination of the thus depicted devices/apparatuses and other network elements, which are configured to cooperate with any one of them.

In general, it is to be noted that respective functional blocks or elements according to above-described aspects can be implemented by any known means, either in hardware and/or software/firmware, respectively, if it is only adapted to perform the described functions of the respective parts. The mentioned method steps can be realized in individual functional blocks or by individual devices, or one or more of the method steps can be realized in a single functional block or by a single device.

Generally, any structural means such as a processor or other circuitry may refer to one or more of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software/firmware or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or exemplary embodiments thereof provide measures for enabling power control for inter-band multi-carrier capable devices, such as e.g. inter-band carrier aggregation capable devices. Such measures may exemplarily comprise calculating at least one output power restriction value for a cumulative output power for a combination of at least two uplink carriers of a terminal device, said two uplink carriers operating on different bands, signaling the calculated at least one output power restriction value to the terminal device, and performing power control for the at least two uplink carriers using the acquired at least one output power restriction value at the terminal device.

The measures according to exemplary embodiments of the present invention may be applied for any kind of network environment, such as for example for communication systems in accordance with 3GPP RAN1/RAN2/RAN3/RAN4 standards, i.e. LTE standards of release 10/11/12/ . . . (including LTE-Advanced and its evolutions) and/or UMTS standards and/or WCDMA standards and/or HSPA standards. In particular, the measures according to exemplary embodiments of the present invention may be applied to inter-band carrier aggregation which is a feature of 3GPP LTE standards of release 10/11/12 and onwards.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
ACLR Adjacent Channel Leakage Ratio
A-MPR Additional Maximum Power Reduction
CA Carrier Aggregation
CC Component Carrier
DL Downlink
eNB evolved Node B (E-UTRAN base station)
E-UTRAN Evolved UTRAN
HSPA High Speed Packet Access
IM Intermodulation
IMD Intermodulation distortion
ISM band Industrial, Scientific and Medical band
LTE Long Term Evolution
LTE-A Long Term Evolution Advanced
NS Network Signaling
PSD Power Spectral Density
RAT Radio Access Technology
RB Resource Block
TX Transmitter/Transmission
UE User Equipment
UL Uplink
UMTS Universal Mobile Telecommunications System
UTRAN Universal Terrestrial Radio Access Network
WCDMA Wideband Code Division Multiple Access
WLAN Wireless Local Area Network

What is claimed is:

1. A method for operating a base station or access node of a cellular system, the method comprising
calculating by the base station or access node at least one output power restriction value for a cumulative output power for a combination of simultaneous transmissions on at least two uplink carriers by a terminal device, said two uplink carriers operating on different bands and said calculating is based on information about movement of the terminal device, and
signaling by the base station or access node the calculated at least one output power restriction value to the terminal device.

2. The method according to claim 1, wherein
the calculating is based on at least one intermodulation power equation for the intermodulation power of the at least two uplink carriers, an allowable intermodulation power, and one or more related device-specific parameters of the terminal device and/or movement-related information of the terminal device, and/or
the signaling comprises signaling band-specific output power restriction values for the at least two uplink carriers.

3. The method according claim 1, wherein the at least one output power restriction value comprises at least one of
an output power restriction value for each combination of uplink carriers of the terminal device,
an output power restriction value for those combinations of uplink carriers of the terminal device, which cause intermodulation distortion on at least one of a downlink carrier and a reception band of the terminal device, and
an output power restriction value for a group of combinations of uplink carriers of the terminal device, which cause a specific order intermodulation distortion on at least one of a downlink carrier and a reception band of the terminal device.

4. The method according to claim 1, wherein the at least one output power restriction value indicates at least one of
a maximum allowable output power value, and
a maximum output power reduction value.

5. The method according to claim 1, wherein
the method is operable in at least one of a LTE and a LTE-A cellular system, and/or the combination of the at least two uplink carriers of the terminal device, for which the at least one output power restriction value for the cumulative output power is calculated, constitutes an inter-band carrier aggregation.

6. A method for operating a terminal device, the method comprising
sending to a base station or access node of a cellular system information about movement of the terminal device;
acquiring at the terminal device from the base station or access node at least one output power restriction value for a cumulative output power for a combination of simultaneous transmissions by the terminal device on at least two uplink carriers, said two uplink carriers operating on different bands, and the output power restriction value having been calculated based on the sent information about movement of the terminal device; and
performing power control for the at least two uplink carriers using the acquired at least one output power restriction value at the terminal device.

7. The method according to claim 6,
wherein the at least one output power restriction value is based on at least one intermodulation power equation for the intermodulation power of the at least two uplink carriers, an allowable intermodulation power, and one or more related device-specific parameters of the terminal device and/or movement-related information of the terminal device, and/or
the power control comprises splitting the at least one output power restriction value over the at least two uplink carriers of the terminal device based on at least one of one or more device properties of the terminal device, one or more interference conditions on at least one of a downlink carrier and a reception band of the terminal device, and one or more performance requirements of at least one of a downlink carrier and a reception band of the terminal device, and/or
the acquiring comprises acquiring band-specific output power restriction values for the at least two uplink carriers, and the power control is performed using the acquired at least one output power restriction value and the acquired band-specific output power restriction values at the terminal device.

8. The method according to claim 6, wherein the at least one output power restriction value comprises at least one of
an output power restriction value for each combination of uplink carriers of the terminal device,
an output power restriction value for those combinations of uplink carriers of the terminal device, which cause intermodulation distortion on at least one of a downlink carrier and a reception band of the terminal device, and
an output power restriction value for a group of combinations of uplink carriers of the terminal device, which cause a specific order intermodulation distortion on at least one of a downlink carrier and a reception band of the terminal device.

9. The method according to claim 6, wherein the at least one output power restriction value indicates at least one of
a maximum allowable output power value, wherein the power control is performed such that the cumulative output power for the combination of the at least two uplink carriers is equal to or less than the at least one output power restriction value, and
a maximum output power reduction value, wherein the power control is performed such that the cumulative output power for the combination of the at least two uplink carriers is equal to or less than the difference between a maximum output power value and the at least one output power restriction value.

10. The method according to claim 6, wherein
the method is operable in at least one of a LTE and a LTE-A cellular system, and/or
the combination of the at least two uplink carriers of the terminal device, for which the at least one output power restriction value for the cumulative output power is calculated, constitutes an inter-band carrier aggregation.

11. An apparatus for operating a base station or access node of a cellular system, the method comprising
at least one processor,
at least one memory including computer program code, and
at least one interface configured for communication with at least another apparatus, the at least one processor, with the at least one memory and the computer program code, being configured to cause the apparatus to:
calculate by the base station or access node at least one output power restriction value for a cumulative output power for a combination of simultaneous transmissions on at least two uplink carriers by a terminal device, said two uplink carriers operating on different bands and said calculating is based on information about movement of the terminal device, and signal by the base station or access node the calculated at least one output power restriction value to the terminal device.

12. The apparatus according to claim 11, wherein
the at least one processor, with the at least one memory and the computer program code, is configured to cause the apparatus to perform the calculating based on at least one intermodulation power equation for the intermodulation power of the at least two uplink carriers, an allowable intermodulation power, and one or more related device-specific parameters of the terminal device and/or movement-related information of the terminal device, and/or
the signaling comprises band-specific output power restriction values for the at least two uplink carriers.

13. The apparatus according to claim 11, wherein the at least one output power restriction value comprises at least one of
an output power restriction value for each combination of uplink carriers of the terminal device,
an output power restriction value for those combinations of uplink carriers of the terminal device, which cause intermodulation distortion on at least one of a downlink carrier and a reception band of the terminal device, and
an output power restriction value for a group of combinations of uplink carriers of the terminal device, which cause a specific order intermodulation distortion on at least one of a downlink carrier and a reception band of the terminal device.

14. The apparatus according to claim 11, wherein the at least one output power restriction value indicates at least one of
a maximum allowable output power value, and
a maximum output power reduction value.

15. The apparatus according to claim 11, wherein
the apparatus is operable in at least one of a LTE and a LTE-A cellular system, and/or
the combination of the at least two uplink carriers of the terminal device, for which the at least one output power restriction value for the cumulative output power is calculated, constitutes an inter-band carrier aggregation.

16. An apparatus for operating a terminal device, the method comprising
at least one processor,
at least one memory including computer program code, and
at least one interface configured for communication with at least another apparatus, the at least one processor, with the at least one memory and the computer program code, being configured to cause the apparatus to:
send to a base station or access node of a cellular system information about movement of the terminal device,
acquire at the terminal device from the base station or access node at least one output power restriction value for a cumulative output power for a combination of simultaneous transmissions by the terminal device on at least two uplink carriers, said two uplink carriers operating on different bands, and the output power restriction value having been calculated based on the sent information about movement of the terminal device, and
perform power control for the at least two uplink carriers using the acquired at least one output power restriction value at the terminal device.

17. The apparatus according to claim 16, wherein
the at least one output power restriction value is based on at least one intermodulation power equation for the intermodulation power of the at least two uplink carriers, an allowable intermodulation power, and one or more related device-specific parameters of the terminal device and/or movement-related information of the terminal device, and/or
performing the power control comprises splitting the at least one output power restriction value over the at least two uplink carriers of the terminal device based on at least one of one or more device properties of the terminal device, one or more interference conditions on at least one of a downlink carrier and a reception band of the terminal device, and one or more performance requirements of at least one of a downlink carrier and a reception band of the terminal device, and/or
the acquiring comprises acquiring band-specific output power restriction values for the at least two uplink carriers, and to perform the power control using the acquired at least one output power restriction value and the acquired band-specific output power restriction values at the terminal device.

18. The apparatus according to claim 16, wherein the at least one output power restriction value comprises at least one of
an output power restriction value for each combination of uplink carriers of the terminal device,
an output power restriction value for those combinations of uplink carriers of the terminal device, which cause intermodulation distortion on at least one of a downlink carrier and a reception band of the terminal device, and
an output power restriction value for a group of combinations of uplink carriers of the terminal device, which cause a specific order intermodulation distortion on at least one of a downlink carrier and a reception band of the terminal device.

19. The apparatus according to claim 16, wherein the at least one output power restriction value indicates at least one of
a maximum allowable output power value, wherein the at least one processor, with the at least one memory and the computer program code, is configured to cause the apparatus to perform the power control such that the cumulative output power for the combination of the at least two uplink carriers is equal to or less than the at least one output power restriction value, and
a maximum output power reduction value, wherein the at least one processor, with the at least one memory and the computer program code, is configured to cause the apparatus to perform the power control such that the cumulative output power for the combination of the at least two uplink carriers is equal to or less than the difference between a maximum output power value and the at least one output power restriction value.

20. The apparatus according to claim 16, wherein
the apparatus is operable in at least one of a LTE and a LTE-A cellular system, and/or the combination of the at least two uplink carriers of the terminal device, for which the at least one output power restriction value for a cumulative output power is calculated, constitutes an inter-band carrier aggregation.

* * * * *

UNITED STATES PATENT AND TRADEMARK OFFICE
CERTIFICATE OF CORRECTION

| | | |
|---|---|---|
| PATENT NO. | : 8,861,413 B2 | Page 1 of 1 |
| APPLICATION NO. | : 13/370533 | |
| DATED | : October 14, 2014 | |
| INVENTOR(S) | : Antti Oskari Immonen et al. | |

It is certified that error appears in the above-identified patent and that said Letters Patent is hereby corrected as shown below:

In the Claims

Claim 11, column 18, line 53: Replace "the method comprising" with --the apparatus comprising--.

Claim 16, column 19, lines 42 through 43: Replace "the method comprising" with --the apparatus comprising--.

Signed and Sealed this
Thirty-first Day of March, 2015

Michelle K. Lee
*Director of the United States Patent and Trademark Office*